Sept. 26, 1944.   C. F. TEICHMANN   2,358,945
METHOD OF DETERMINING THE POROSITY AND LOCATION
OF PERMEABLE FORMATIONS IN OIL WELLS
Filed Aug. 31, 1940
FIG. 1
FIG. 2
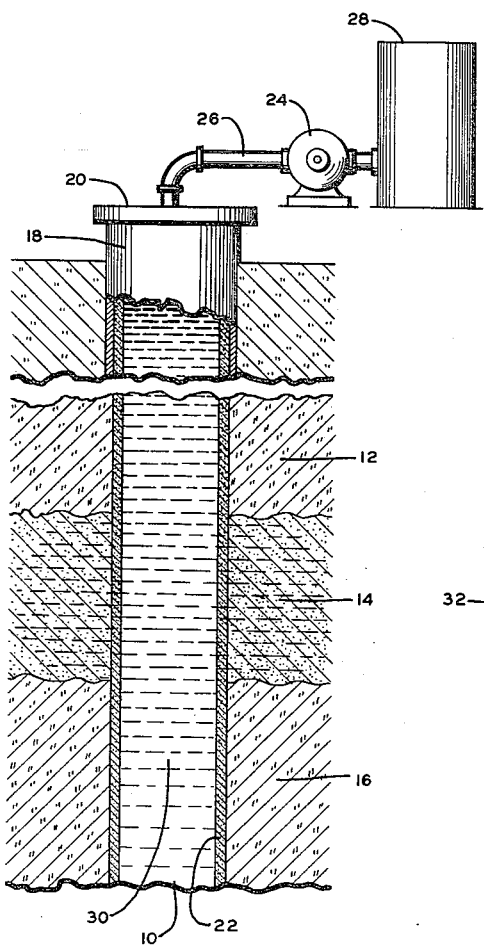
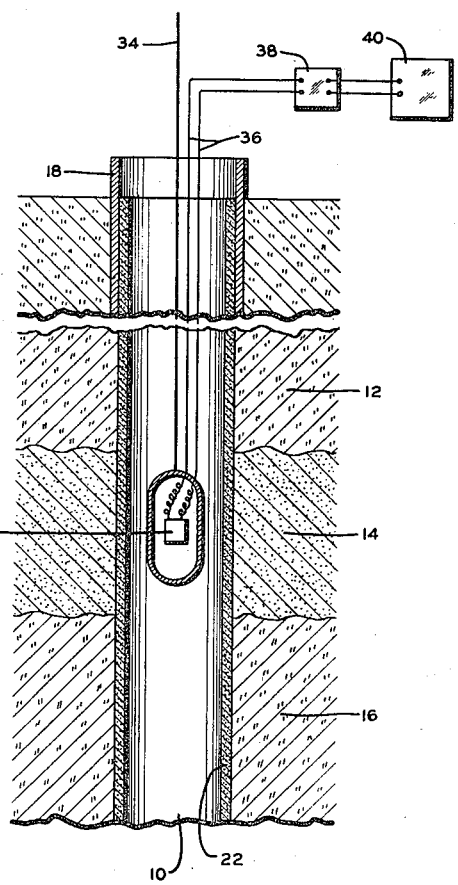
CHARLES F. TEICHMANN
INVENTOR
BY R. J. Dearborn
Daniel Stryker
HIS ATTORNEYS Patented Sept. 26, 1944

2,358,945

UNITED STATES PATENT OFFICE 2,358,945

METHOD OF DETERMINING THE POROSITY AND LOCATION OF PERMEABLE FORMATIONS IN OIL WELLS

Charles F. Teichmann, Mount Vernon, N. Y., assignor to Texaco Development Corporation, New York, N. Y., a corporation of Delaware Application August 31, 1940, Serial No. 355,102

8 Claims. (Cl. 250—83.6)

This invention relates to the logging of wells or bore holes and more particularly to a method for determining the location of porous strata through which a well or bore hole has been drilled. The primary object of the invention is to provide a relatively simple method by means of which the presence and location of one or more porous formations surrounding a well or bore hole may be accurately determined.

It is desirable, if not essential, that a driller know the nature of the formation strata through which the drill penetrates in boring a hole for a well. The taking of cores is often a slow procedure and after the cores are obtained it is, of course, necessary to examine or analyze them carefully in order that information as to the structures penetrated by the core drill may be known. The electrical methods for well logging usually require expensive and often cumbersome instruments and electrical apparatus, whereas, the method now to be described, the apparatus required is of a relatively simple type.

In accordance with this invention, after a hole has been drilled it is filled with a fluid containing a radioactive substance and pressure exerted on the fluid forces some of the fluid together with the radioactive substance contained therein into any porous or permeable formations through which the well has penetrated. This fluid is then removed from the hole and an instrument such as a Geiger-Muller counter is lowered through the hole. This instrument will detect radiation from the radioactive substance remaining in the permeable formations and, knowing the depth of the instrument in the hole, the presence and location of these formations can be readily determined.

For a better description of the invention, reference may be had to the accompanying drawing in which:

Figure 1 is a vertical sectional elevation through a bore hole showing the fluid containing the radioactive substance in the hole; and Figure 2 is a diagrammatic vertical sectional elevation through the same hole and showing the detecting instrument being lowered therethrough.

Referring to the drawing, a hole 10 is shown as having been drilled through the formations 12, 14 and 16. The upper portion of the hole has been provided with a casing 18 having a head 20 whereby the upper end of the hole may be sealed. Filter cake 22 formed by the drilling fluid or mud is shown as having been deposited on the walls of the hole. A pump 24 is connected by means of suitable piping 26 to the interior of the casing and the suction side of the pump is connected to a tank or other receptacle 28 containing a fluid to which a small amount of a radioactive substance has been added.

After the drilling fluid has been removed from the hole 10, the pump 24 is operated to fill the hole with the fluid 30 containing the radioactive substance. Additional pressure is then applied to the liquid 30 as by the pump 24 and the liquid will be forced through the filter cake and into a porous or permeable strata such as is shown at 14.

The liquid 30 is then removed from the well by any suitable means such as by pumping or bailing, after which the hole may or may not be filled with a liquid free from the radioactive substance. An instrument containing a device 32 sensitive to radioactivity, such as a Geiger-Muller counter, is then lowered through the hole 10 by any suitable means such as a cable or wire line 34. The instrument is preferably electrically connected by wires 36 to an amplifier 38 and to a meter or recorder 40. While the instrument 32 is passing through formations such as 12 and 16, which are not porous, the device 40 will, of course, not indicate the presence of any appreciable amount of the radio-active substance. However, when the instrument 32 is passing through the porous formation 14 the presence of the radioactive substance previously forced into this formation will be detected by the instrument and indicated or recorded at the surface by means of the device 40. In this manner the presence and location of porous formations or strata may be accurately determined without the necessity for costly and complicated equipment.

In case water is used as the medium for carrying the radioactive substance into the hole and then into the permeable formations, it will, of course, be necessary to use as the radioactive material a substance which will remain soluble in the water and which will not absorb or exchange with the metals of the clay of the drilling fluid since otherwise the radio-active material would not be carried into the formation with the infiltering water but rather would be retained in the filter cake 22 on the walls of the hole. One of the radio-active emanations such as radon, thoron or actinon would be suitable in this respect since these are inert gases partly soluble in water and not reactive with clays or salts. In case oil instead of water should be used for carrying the radioactive substance into the hole, radium naphthenate could be dissolved in the oil and used satisfactorily as the radioactive substance.

In case it is thought that the filter cake 22 when deposited on the walls of the hole will not be sufficiently porous to allow the passage therethrough of the liquid containing the radioactive substance, the fluid used in drilling the hole may be treated prior to its use so as to provide filter cakes which are uniformly permeable. This treatment may be accomplished by incorporating in the drilling mud or fluid a chemical compound such as calcium carbonate or other alkaline earth carbonates which are normally slightly soluble in water but which on reaction with mineral acids such as hydrochloric, sulfuric or the like are decomposed. Another method of treatment would be to incorporate in the drilling fluid a normally water insoluble element such as aluminum which can be subsequently dissolved out of the deposit filter cake by treating the filter cake with caustic soda or potash. Any other method which effects increased permeability of the filter cake will be suitable.

As a modification of the invention, the filter cake 22 could be removed from the walls of the hole either mechanically or by chemical means prior to filling the hole with the liquid containing the radioactive substance. Although this method may not be desirable where a considerable depth of hole is being logged, it would, however, be satisfactory in logging short lengths of hole, particularly where extremely accurate measurements of porosity are desired. In order to remove the filter cake, that portion of the hole where logging is desired can be washed with a deflocculating agent such, for instance, as Quebracho and caustic or sodium hexametaphosphate or a mixture of a deflocculating agent and a detergent, after which the hole would be bailed to remove the dislodged filter cake. After the filter cake is removed, the radioactive solution is injected in the manner described hereinbefore and forced back into the formation, after which a radioactivity count is made as described.

Obviously, many other modifications and variations of the invention may be made without departing from the spirit and the scope thereof, and therefore only such limitations should be imposed as are indicated in the appended claims.

I claim:

1. The method of determining the presence and location of permeable formations surrounding a bore hole which comprises treating the filter cake deposited on the walls of the hole to render said filter cake permeable, circulating a solution of a radioactive substance into said hole, applying pressure to the solution to force it through the filter cake and into permeable formations surrounding the hole, removing from the hole the solution not absorbed by the formations and then passing an instrument through the hole to detect the radioactivity of the surrounding formations.

2. The method of determining the porosity of the formations surrounding a bore hole drilled through those formations which comprises removing the filter cake deposited on the walls of the hole by the drilling fluid, placing in the hole a fluid containing a radioactive material, exerting pressure on said second fluid to force a portion thereof into the strata surrounding the hole, removing the surplus second fluid from the hole and then noting the intensity of the radioactivity of said formations.

3. The method of determining the porosity of the formations surrounding a bore hole drilled through those formations which comprises removing the filter cake deposited on the walls of the hole by the drilling fluid by washing said filter cake with a deflocculating agent, placing in the hole a fluid containing a radioactive material, exerting pressure on said second fluid to force a portion thereof into the strata surrounding the hole, removing the surplus fluid from the hole and then noting the intensity of the radioactivity of said formations.

4. The method of determining the porosity of the formations surrounding a bore hole drilled through those formations which comprises washing the filter cake deposited on the walls of the hole by an oil base drilling fluid with a solvent to render the filter cake permeable, placing in the hole an oil containing a small quantity of radium naphthenate, exerting pressure on said oil to force a portion thereof into the strata surrounding the hole, removing the remaining oil from the hole and then noting the intensity of the radioactivity of said formations.

5. The method of determining the porosity of the formations surrounding a bore hole drilled through those formations which comprises treating the hole to overcome the impermeability of any coating adhering to the hole walls, placing in the hole a fluid containing a radioactive material, exert pressure on said fluid to force a portion thereof into the formations surrounding the hole, removing the surplus fluid from the hole and then noting the intensity of the radioactivity of said formations.

6. The method according to claim 5 in which the radioactive fluid is an aqueous solution of radon.

7. The method according to claim 5 in which the radioactive material is thoron.

8. The method according to claim 5 in which the radioactive fluid is oil to which has been added a small quantity of radium naphthenate.

CHARLES F. TEICHMANN.